US012782137B2

(12) United States Patent
Chu

(10) Patent No.: US 12,782,137 B2
(45) Date of Patent: Nov. 3, 2026

(54) CONING, SCULLING AND SCROLLING ERROR COMPENSATION METHOD FOR STRAPDOWN INERTIAL NAVIGATION SYSTEM

(71) Applicant: VIETTEL GROUP, Ha Noi City (VN)

(72) Inventor: Trong Su Chu, Ha Noi City (VN)

(73) Assignee: VIETTEL GROUP, Ha Noi City (VN)

( * ) Notice: Subject to any disclaimer, the term of this patent is extended or adjusted under 35 U.S.C. 154(b) by 33 days.

(21) Appl. No.: 18/901,987

(22) Filed: Sep. 30, 2024

(65) Prior Publication Data

US 2025/0237507 A1 Jul. 24, 2025

(30) Foreign Application Priority Data

Jan. 23, 2024 (VN) .............................. 1-2024-00549

(51) Int. Cl.
*G01C 21/16* (2006.01)

(52) U.S. Cl.
CPC .................................... *G01C 21/16* (2013.01)

(58) Field of Classification Search
CPC ...................................................... G01C 21/16
See application file for complete search history.

(56) References Cited

FOREIGN PATENT DOCUMENTS

| | | | | |
|---|---|---|---|---|
| CN | 106705968 A | * | 5/2017 | ............. G01C 21/18 |
| CN | 114923483 A | * | 8/2022 | ........... G01C 21/165 |
| EP | 2264485 A1 | * | 12/2010 | ......... G01C 21/1654 |

OTHER PUBLICATIONS

James D. Brouk and Kyle J. DeMars, Uncertainty Propagation for Inertial Navigation with Coning, Sculling, and Scrolling Corrections, 2021, Department of Aerospace Engineering, Texas A&M University (Year: 2021).*

Lingling Wang, Li Fu, and Ming Xin, Sculling Compensation Algorithm for SINS Based on Two-Time Scale Perturbation Model of Inertial Measurements,2018, School of Automation Science and Electrical Engineering, Beihang University (Year: 2018).*

* cited by examiner

*Primary Examiner* — Hunter B Lonsberry
*Assistant Examiner* — Besufekad Lemma Tessema
(74) *Attorney, Agent, or Firm* — patenttm.us

(57) ABSTRACT

The invention proposes a method to compensate for coning, sculling, and scrolling errors in a strapdown navigation system using a calculation technique that avoids using trigonometric and rounding functions. This method minimizes calculation errors and reduces computational load by eliminating the need for performing directional vector product multiplication twice. The technical solution used to compensate for motion errors that cause angle calculation errors is based on a function that approximates the calculation errors between methods, allowing the selection of the appropriate calculation method and rounding degree. The solution to compensate the velocity and position motion errors is achieved by above accurate angle error compensation.

3 Claims, 4 Drawing Sheets

CONING, SCULLING AND SCROLLING ERROR COMPENSATION METHOD FOR STRAPDOWN INERTIAL NAVIGATION SYSTEM

TECHNICAL FIELD COVERED

The invention covers coning, sculling and scrolling error compensation method for strapdown inertial navigation system. Specifically, the mentioned method utilizes data processing techniques.

TECHNICAL STATUS OF THE INVENTION

Strapdown inertial navigation system (SINS) is a navigation system that calculates the state (position, velocity, angle) of a vehicle in the future based on its initial state (dead-reckoning technique). With civil devices that do not need high precision or complicated moving orbits, or can optionally use integrated auxiliary sensor devices such as GNSS and ground information stations, the closed-loop combination of observers (such as the Kalman filter) can maintain or reduce the systematic error to an acceptable level with the help of auxiliary sensor updating process. However, in reality, devices that require high independence often move with complex trajectories to avoid obstacles and are not dependent on external auxiliary sensors (due to possible interference). Therefore, ensuring proactive systematic error in all situations is essential.

The problem of controlling the allocation of positioning errors is a critical aspect in the design of navigation systems with a given total error requirement. Inertial positioning errors are categorized into three main components: sensor error, initialization error, and computational error. Efforts to mitigate and estimate errors arising from sensors and initialization are always prioritized, as they are typically the primary contributors to the total error. However, neglecting computational errors can limit the operational range of the system. The computational errors discussed here include not only rounding errors due to hardware limitations (which are uncorrectable and constitute a small proportion) but also errors related to the rounding methods used during the integration of differential equations of strapdown inertial navigation system. In low-cost commercial systems, under conditions where GPS is not used and complex movements occur, the total strapdown inertial navigation system error will be greater than the estimated error caused by sensor and initialization errors. The movements referred to here include those causing angular computation errors (hereafter called coning motion), those causing velocity computation errors (hereafter called sculling motion), and those causing position computation errors (hereafter called scrolling motion).

The techniques for compensating errors caused by movements that generate angular, velocity, and position computational errors have been addressed since the introduction of strapdown inertial navigation systems in the 1970s. However, due to the limitations in high-frequency computation and the lack of effective approaches, there has been little progress in compensating for these errors over the years. These approaches have not been optimized for all types of movements and primarily focus on compensating for specific movements, such as pure coning, sculling, and scrolling motions that create angular, velocity, and position computational errors, respectively.

Current technical solutions for compensating errors in strapdown inertial navigation systems have two main drawbacks:

Complexity and computational load: These solutions often use trigonometric functions that are difficult to implement in embedded systems or employ rough approximation functions that result in large errors. Alternatively, they might use functions involving double vector products, which significantly increase computational load.

High-frequency computation requirements: To reduce computational errors, these solutions typically require high-frequency calculations. This is to compensate for the large errors that arise from low-frequency computations. Some methods use time-based functions to approximate acceleration and angular velocity over short periods for integration, resulting in a high computational burden. High-frequency computation solutions depend on the hardware capabilities of the inertial sensors to provide high-frequency acceleration or angular velocity data.

Motion Error Compensation Method for Angular Computational Errors:

Transforming the coordinate system (a) to another coordinate system (b) with the same origin by rotation can be represented using a set of Euler angles (roll, pitch, yaw), a 3×3 direction cosine matrix (DCM-C), or a four-dimensional vector (quaternion-q). With a basic understanding, these quantities can be converted into one another. The quaternion representing the transformation of coordinate system (b) obtained by rotating system (a) around a fixed unit vector e (which can be temporarily fixed) by an angle α is given by:

$$q = \cos\frac{\alpha}{2} + e\sin\frac{\alpha}{2} = [q_0 q_v], \tag{1}$$

$$\text{Here } q_0 = \cos\frac{\alpha}{2},\ q_v = e\sin\frac{\alpha}{2}.$$

The differential form of the equation (1) is obtained as follows:

$$\dot{q} = \frac{1}{2} q^{\circ}\omega, \tag{2}$$

where ω is instantaneous angular velocity vector in the b-coordinate system (b).

From the equation (2) we have:

$$\omega = 2q^{*\circ}\dot{q} = \dot{\alpha}e + \sin\alpha\dot{e} - (1-\cos\alpha)e\times\dot{e} \tag{3}$$

Equation (3) shows that if vector e is unchanged during the $t_1$ to $t_2$ period of time, we have:

$$\alpha = \int_{t_1}^{t_2} w\,dt.$$

here w=|ω|.

However, the positioning calculation in equation (2) requires the integration of the angular velocity vector w over time rather than its magnitude. Note that the vector e can change over time. Without loss of generality, we define the vector ϕ as follows:

$$\phi = f(\alpha)e. \tag{4}$$

On the other hand, from equation (2) combined with equations (1) and (3), we have:

$$\dot{\alpha} = \omega \cdot e;\ \dot{e} = \frac{1}{2} e \times \omega + \frac{1}{2} e \times (e \times \omega) \cot\frac{\alpha}{2} \tag{5}$$

From equation (4), we obtain:

$$\dot{\phi} = \frac{\partial f}{\partial \alpha} \dot{\alpha} e + f(\alpha) \dot{e} \overset{def}{=} f'_\alpha(\alpha) \dot{\alpha} e + f(\alpha) \dot{e}. \tag{6}$$

Combining equations (5) and (6), we obtain:

$$\dot{\phi} = f'_\alpha(\alpha)\omega + \frac{1}{2}\phi \times \omega + \frac{1}{f^2(\alpha)}\left(f'_\alpha(\alpha) - \frac{1}{2} f(\alpha)\cot\frac{\alpha}{2}\right)\phi \times (\phi \times \omega). \tag{7}$$

Currently, technical solutions commonly used to address the problem of compensating coning errors can be classified into two types:

The first approach is the rotation vector method:

With the traditional solution approach $$f(\alpha) = \alpha, \tag{8}$$

Vector ϕ from here will be call the rotation vector:

$$\phi = \alpha e. \tag{9}$$

when f(α)=α, we get:

$$f'_\alpha(\alpha) = 1. \tag{10}$$

From equations (1) and (9), we have:

$$q = \cos\frac{|\phi|}{2} + \frac{\phi}{|\phi|}\sin\frac{|\phi|}{2} \tag{11}$$

Substituting equations (8) and (10) into equation (7), we obtain:

$$\dot{\phi} = \omega + \frac{1}{2}\phi \times \omega + \frac{1}{|\phi|^2}\left(1 - \frac{|\phi|\sin|\phi|}{2(1-\cos|\phi|)}\right)\phi \times (\phi \times \omega) \approx \omega + \frac{1}{2}\phi \times \omega + \frac{1}{12}\phi \times (\phi \times \omega) \tag{12}$$

The relationship between the direction cosine matrix (DCM) and the four-dimensional vector (quaternion) is as follows:

$$C = (q_0^2 - q_v^T q_v)I + 2q_v q_v^T - 2q_0 q_v \times. \tag{13}$$

Given equations (13) and (11), for a small dt, we can approximate as follows:

$$C = \cos|\phi| I + \frac{1-\cos|\phi|}{|\phi|^2}(\phi \times)^2 - \frac{\sin|\phi|}{|\phi|}\phi \times \approx I - \frac{\sin|\phi|}{|\phi|}\phi \times + \frac{1-\cos|\phi|}{|\phi|^2}(\phi \times)^2. \tag{14}$$

The second approach is the Rodrigues vector:

Rodrigues vector is defined as follows:

$$\phi = 2\tan\frac{\alpha}{2} e. \tag{15}$$

In this case, we have:

$$f'_\alpha(\alpha) = \frac{1}{\cos^2\frac{\alpha}{2}} = 1 + \tan^2\frac{\alpha}{2}, \tag{16}$$

Combining equations (15) and (1), we obtain:

$$q = \frac{2 + \phi}{\sqrt{4 + |\phi|^2}}, \tag{17}$$

Substituting equations (15) and (16) into equation (7), we have:

$$\dot{\phi} = \left(1 + \frac{\phi^2}{4}\right)\omega + \frac{1}{2}\phi \times \omega + \frac{1}{4}\phi \times (\phi \times \omega) \approx \omega + \frac{1}{2}\phi \times \omega + \frac{1}{4}\phi \times (\phi \times \omega) \tag{18}$$

Similarly, using equations (13) and (17), we have:

$$C = \left(\frac{4 - |\phi|^2}{4 + |\phi|^2}\right)I + \frac{2(\phi \times)^2}{4 + |\phi|^2} - \frac{4\phi \times}{4 + |\phi|^2} \approx I - \frac{4}{4 + |\phi|^2}\phi \times + \frac{2}{4 + |\phi|^2}(\phi \times)^2 \tag{19}$$

It is evident that both approaches in equations (12) and (18) involve expressions for ϕ with three components, with the third component typically requiring the most computational effort. Additionally, the expression for the DCM matrix always contains three components.

Velocity and Position Error Compensation Method:

In this section, the author summarizes results from other researchers, particularly from Paul G. Savage's series [Paul G. Savage, "Strapdown Analytics," Strapdown Associates, 2000, 2nd edition, two parts]. The main objective is to highlight the components that the navigation system needs to compensate for in differential equation calculations. These errors are generated by movements, referred to as coning, sculling, and scrolling.

Computation of a strapdown inertial navigation system on different coordinate reference frames (such as ECI, ECEF, NED, etc.) are based on convenience in calculations, habits, and the integration of various data sources. Similarly, calculations involving Euler angles, DCM differential equations, or quaternions are performed.

For example, when computing in the NED frame we have:

For Euler angles, derived from the DCM matrix using equation (13), the quaternion is calculated using the rotation vector differential equation (7).

For the velocity:

$$v_m^N = v_{m-1}^N + v_g^N(t_m) + C_{B_{m-1}}^N v_{SF}^{B_{m-1}}(t_m) \tag{20.1}$$

$$\text{Here } v_g^N(t) = \int_{t_{m-1}}^{t} g^N dt;$$

$$v_{SF}^{B_{m-1}}(t) = \int_{t_{m-1}}^{t} \dot{v}_{SF}^{B_{m-1}}(t)dt$$

N—Navigation frame, v—velocity, C—Direction cosine matrix, g—gravity, SF—specific force, b or B—body frame, i—inertial frame, m—sample following the time t.

For the position:

$$p_m^N = p_{m-1}^N + v_{m-1}^N T_m + p_g^N(t_m) + C_{B_{m-1}}^N p_{SF}^{B_{m-1}}(t_m) \tag{20.2}$$

In which $$p_g^N(t) = \int_{t_{m-1}}^{t} v_g^N dt;$$

$$p_{SF}^{B_{m-1}}(t) = \int_{t_{m-1}}^{t} \dot{p}_{SF}^{B_{m-1}}(t)dt;$$

p—position, $T_m$—the duration from $t_{m-1}$ to $t_m$.

With average understanding, the solution to the positioning equations for velocity and position in the body frame, assuming that the orientation of the rotation vector is constant and that the direction of acceleration, angular velocity, and their ratios remain unchanged, as well as the lack of correlation between the DCM matrix and the velocity vector, is given by:

$$v_{SF}^{B_{m-1}}(t) = \left[I + f_2(\alpha)\alpha\times + f_3(\alpha)(\alpha\times)^2\right]v; \tag{21.1}$$

$$p_{SF}^{B_{m-1}}(t) = \left[I + 2f_3(\alpha)\alpha\times + 2f_4(\alpha)(\alpha\times)^2\right]S_v; \tag{21.2}$$

In which $$\alpha \equiv \int_{t_{m-1}}^{t} \omega_{ib}^b dt;\ v \equiv \int_{t_{m-1}}^{t} f_{ib}^b dt;\ S_v \equiv \int_{t_{m-1}}^{t} v dt;\ f_1(\alpha) = \sin\alpha/\alpha;\ f_2(\alpha) = (1-\cos\alpha)/\alpha^2;\ f_3(\alpha) = (1 - f_1(\alpha))/\alpha^2;\ f_4(\alpha) = \left(1/2 - f_2(\alpha)\right)/\alpha^2;\ f_{ib}^b -$$

The measured value returned by the accelerometer, $$\omega_{ib}^b -$$

The measured value returned by the gyroscope;

For low-cost navigation systems, the calculations are typically performed according to equation (21).

Under general assumptions and with a basic understanding, the system of navigation equations can be expressed in the following generalized form:

$$v_{SF}^{B_{m-1}}(t) = \left[I + f_2(\Phi)\Phi\times + f_3(\Phi)(\Phi\times)^2\right]\eta; \tag{22.2}$$

-continued $$p_{SF}^{B_{m-1}}(t) = \left[I + 2f_3(\Phi)\Phi\times + 2f_4(\Phi)(\Phi\times)^2\right]\zeta; \tag{22.3}$$

Here $$f_1(\Phi) = \sin\Phi/\Phi = 1 - \Phi^2/3! + \Phi^4/5! - \ldots;$$

$$f_2(\Phi) = \left(1 - \cos\Phi/\Phi^2 = 1/2! - \Phi^2/4! + \Phi^4/6! - \ldots;\right.$$

$$f_3(\Phi) = (1 - f_1(\Phi))/\Phi^2 = 1/3! - \Phi^2/5! + \ldots;$$

$$f_4(\Phi) = \left(1/2 - f_2(\Phi)\right)/\Phi^2 = 1/4! - \Phi^2/6! + \ldots;$$

In which Φ=|Φ| and is defined in (12) and (14). The components Φ, η and ζ are calculated as follows:

$$\Phi = \omega + \frac{1}{2}\phi\times\omega + f_5\phi\times(\phi\times\omega); \tag{23.1}$$

$$\begin{aligned} \dot{\eta} = {} & f_{ib}^b + \frac{1}{2}\left(\phi\times f_{ib}^b + \Phi\times\eta\right) + \\ & f_5\phi\times\left(\phi\times f_{ib}^b - \Phi\times\eta\right) + f_3\left(\phi\times\Phi\right)\times\eta - \frac{1}{2}f_3\phi\times\left[\left(\phi\times\Phi\right)\times\eta\right] + \\ & f_4\phi^2\Phi\times\eta + f_6\phi\times\left[\left(\phi\times\Phi\right)\times\eta\right] + \frac{1}{2}f_3\phi\cdot\omega\phi\times\eta + \\ & f_7(\phi)\times\left\{\phi\times\left(\phi\times\Phi\right)\times\eta\right\} + f_8\phi^2\left(\phi\times\Phi\right)\times\eta - f_8\phi\cdot\omega\phi\times(\phi\times\eta) \end{aligned} \tag{23.2}$$

$$\begin{aligned} \dot{\zeta} = {} & \eta + \frac{1}{6}\left(\phi\times\eta - 2\dot{\phi}\times\zeta\right) + f_9\phi\times\left(\phi\times\eta - 2\dot{\phi}\times\zeta\right) + \\ & 2f_4\left(\phi\times\dot{\Phi}\right)\times\zeta - f_{10}\phi\times\left[\left(\phi\times\dot{\phi}\right)\times\zeta\right] - f_{11}\phi^2\phi\times\eta + \\ & f_{12}\phi^2\dot{\phi}\times\eta + f_{13}\phi\times\left[\phi\times\left(\dot{\phi}\times\zeta\right)\right] + f_{14}\phi\cdot\omega\phi\times\zeta + \\ & f_{15}\phi\times\left\{\phi\times\left[\left(\phi\times\dot{\phi}\right)\times\zeta\right]\right\} + f_{16}\phi^2\phi\times\left(\dot{\phi}\times\eta\right) - f_{17}\phi\cdot\omega\phi\times(\phi\times\zeta) \end{aligned} \tag{23.3}$$

$$\text{Where } f_5 = \frac{1}{\phi^2}\left[1 - \frac{\phi\sin\phi}{2(1-\cos\phi)}\right];\ f_6 = \frac{1}{\phi^2}\left(1 - \frac{1}{2}f_1 - f_2\right);$$

$$f_7 = f_3 f_5;\ f_8 = \frac{1}{2\phi^4}\left[5 + \cos\phi - \frac{3\phi\sin\phi}{(1-\cos\phi)}\right];$$

$$f_9 = f_3 - f_2 h_1 + h_2\left(1 - f_3\phi^2\right);$$

$$f_{10} = 2f_4 h_2;\ f_{11} = \frac{1}{\phi^2}\left[h_1\left(1 - f_3\phi^2\right) - f_2\left(1 - h_2\phi^2\right) + \frac{1}{6}\right];$$

$$f_{12} = \frac{1}{\phi^2}\left(\frac{1}{6} + f_3\right);\ f_{13} = 2(2f_4 h_1 - f_3 h_2);$$

$$f_{14} = \frac{2}{\phi^4}\left\{(1 + f_1 - 4f_2)h_1\phi^2 - \left[f_2\phi^2 - 3(1 - f_1)\right]\left(1 - h_2\phi^2\right)\right];$$

$$f_{15} = 2f_4 h_2;$$

$$f_{16} = \frac{2}{\phi^2}\left\{f_3 - 2f_4 - h_1(f_2 - f_3) + h_2\left[1 - (f_3 - 2f_4)\phi^2\right]\right\};$$

$$f_{17} = -\frac{2}{\phi^2}\left\{\left[f_2\phi^2 - 3(1 - f_1)\right]h_1 + (1 + f_1 - 4f_2)\left(1 - h_2\phi^2\right)\right\};$$

$$h_1 = \frac{f_3}{2\left(f_2^2 + f_3^2\phi^2\right)};\ h_2 = \frac{f_3^2 - f_2 f_4}{f_2^2 + f_3^2\phi^2};$$

Note that the components on the right side of expression (23) starting from the second one are categorized as follows: In equation (23.1), they are referred to as the coning component. In equation (23.2), they are referred to as the velocity component, and the components in equation (23.3) are referred to as the position component. If we revisit equation (31), we see that these errors are not compensated for.

Thus, after solving equation (22) in its general form and discretizing it, we obtain the following:

$$v_m^N = v_{m-1}^N + v_{g_m}^N + C_{B_{m-1}}^N v_{SF_m}^{B_{m-1}}$$

$$p_m^N = p_{m-1}^N + v_{m-1}^N T_m + p_{g_m}^N + C_{B_{m-1}}^N p_{SF_m}^{B_{m-1}}$$

$$C_{B_m}^N = f(\Phi_m)$$

$$v_{SF_m}^{B_{m-1}} = \left[I + f_2(\Phi_m)\Phi_m \times + f_3(\Phi_m)(\Phi_m \times)^2\right]\eta_m$$

$$p_{SF_m}^{B_{m-1}} = \left[I + 2f_2(\Phi_m)\Phi_m \times + 2f_4(\Phi_m)(\Phi_m \times)^2\right]\zeta_m$$

$$\Phi_m \equiv \int_{t_{m-1}}^{t_m} \dot{\Phi} dt; \eta_m \equiv \int_{t_{m-1}}^{t_m} \dot{\eta} dt; \zeta_m \equiv \int_{t_{m-1}}^{t} \dot{\zeta} dt$$

In which $\Phi_m$, $\eta_m$ and $\zeta_m$ are calculated by solving the differential equation (23) combined with the use of the rounding function as follows:

$$f_3 \approx 1/6; f_4 \approx 1/24; f_5 \approx 1/12; f_6 \approx 1/8;$$

$$f_9 \approx 1/36; f_{10} \approx 1/36; f_{11} \approx 1/540;$$

$$f_{12} \approx 1/60; f_{13} \approx 5/108; f_{14} \approx 1/30;$$

In practice, there have been many specific implementations that can be applied to embedded software. However, the piecewise computation of each part in equation (23) is quite challenging, and the algorithm is not yet truly optimized for all types of motion systems.

TECHNICAL NATURE OF THE INVENTION

The existing methods for compensating motion errors that cause angular, velocity, and position computation errors, as discussed in the technical state of the invention, have certain limitations. The objective of this invention is to utilize a new set of variables in the formula for computing the compensation for motion errors, simplifying the calculation of angular error compensation by reducing the reliance on double vector multiplication or trigonometric functions, and controlling accuracy by using error approximation functions to compare methods. Another goal is to improve the accuracy of the compensation for angular computation errors, which can then be applied to the calculation of velocity and position compensation according to reusable formulas mentioned in the technical state of the invention.

Given the frequency of motion that causes angular, velocity, and position computation errors, it is crucial to choose a computation frequency that is at least twice this frequency, as per the Nyquist sampling theorem. Ensuring the computation frequency meets Nyquist's requirements, the proposed method solves the differential equations at the same frequency as the navigation computation frequency using methods like the Dormand-Prince fifth or eighth-order, instead of older solutions that required higher computation frequencies for error compensation or building time-based functions for acceleration and angular velocity to perform integration.

To achieve the above objectives, the proposed technical solution includes the following steps: step 1: select the computation function; step 2: choose the computation frequency and a method for solving the system of differential equations based on the analysis of the motion frequency of the object; step 3: initialize initial values for strapdown inertial navigation system in the chosen reference frame; step 4: calculate the coning error compensation; step 5: calculate the quaternion, DCM matrix, and Euler angles; step 6: compute the rotation vector value; step 7: compute the sculling and scrolling error compensation; step 8: calculate velocity and position outputs in the computation coordinate system.

DETAILED DESCRIPTION OF THE INVENTION

Figure 1:
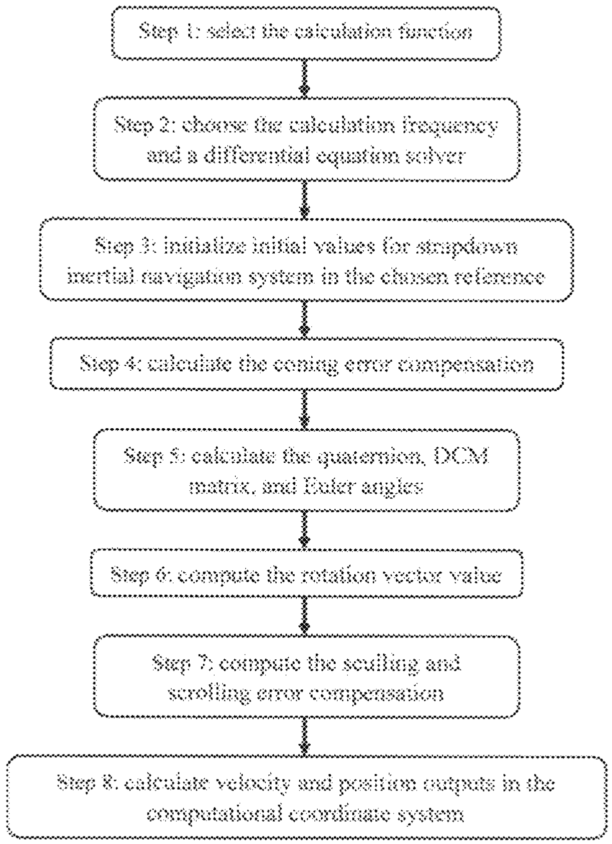
FIG. 1: Illustrates the steps involved in the proposed method.

The proposed method for compensating motion errors that lead to angular computation errors involves:

The approach of this method is as follows, choose f(α) in the final expression of the left-hand side of (7), such that:

$$f_\alpha'(\alpha) - \frac{1}{2}f(\alpha)\cot\frac{\alpha}{2} = 0 \quad (24)$$

In this case, the differential expression of ϕ in (7) will have only two components. To solve the differential equation, we select f(α) as follows:

$$f(\alpha) = \sin\frac{\alpha}{2} \quad (25)$$

Similarly, we have:

$$f_\alpha'(\alpha) = \frac{1}{2}\cos\frac{\alpha}{2} \quad (26)$$

$$\phi = \sin\frac{\alpha}{2}e \quad (27)$$

$$q = \sqrt{1 - |\phi|^2} + \phi \quad (28)$$

(28) is obtained using the small angle α and (7) has the following form:

$$\dot{\phi} = \frac{1}{2}\sqrt{1 - |\phi|^2}\,\omega + \frac{1}{2}\phi \times \omega \quad (29)$$

Using the Taylor approximation function:

$$(1 + x)^{\frac{1}{2}} =$$

-continued $$1+\frac{1}{2}x-\frac{1}{2.4}x^2+\frac{1.3}{2.4.6}x^3-\ldots \text{ vớ i} -1<x\le 1=1+\frac{1}{2}x-\frac{1}{2.4}x^2+O(x^3)$$

(29) with the second-order Taylor approximation, can be approximated as:

$$\dot{\phi}\approx\frac{1}{2}(1+\phi\times)\omega-\frac{1}{4}\phi^2\left(1+\frac{1}{4}\phi^2\right)\omega \tag{30}$$

Similar to (14), (19), from (13), (28) we obtain:

$$C=(1-2|\phi|^2)I-2\sqrt{1-|\phi|^2}\,\phi\times+2(\phi\times)^2. \tag{31}$$

(31) can be approximated as follows:

$$C\approx I-2\phi\times+2(\phi\times)^2. \tag{32}$$

Comparing expressions (29-30) with the results of the first method (12) and the second method (18) discussed in the technical background of the invention, we observe that expressions (29-30) do not contain trigonometric components or double vector multiplications. Thus, these expressions offer a computational advantage for embedded systems.

To compare the accuracy of the proposed method for compensating motion-induced angular computation errors, as well as the rounding order, the proposed method employs the following error approximation functions to evaluate effectiveness:

$$f_0(x)=\left|\frac{1}{2}\sqrt{1-|x|^2}-\frac{1}{2}\right|,$$

$$f_1(x)=\left|\frac{1}{2}\sqrt{1-|x|^2}-\frac{1}{2}\left(1-\frac{1}{2}|x|^2\right)\right|,$$

$$f_2(x)=\left|\frac{1}{2}\sqrt{1-|x|^2}-\frac{1}{2}\left(1-\frac{1}{2}|x|^2-\frac{1}{8}|x|^4\right)\right|,$$

$$g(x)=\left|\frac{1}{12}-\frac{1}{|x|^2}\left[1-\frac{|x|\sin(|x|)}{2(1-\cos(x))}\right]\right|,$$

$$h(x)=g(x)|x|^2,$$

$$k(x)=\frac{|x|^2}{4},$$

Figure 2:
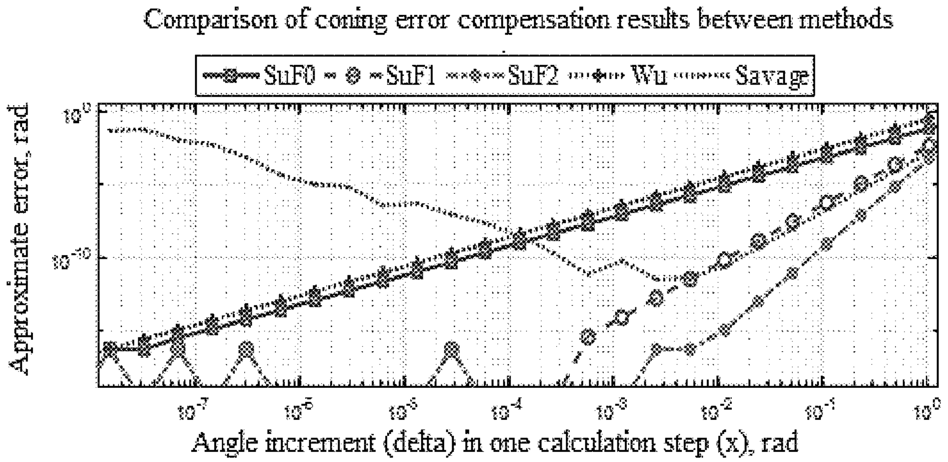
FIG. 2: Shows a chart comparing the error between different approximation methods.
Figure 3:
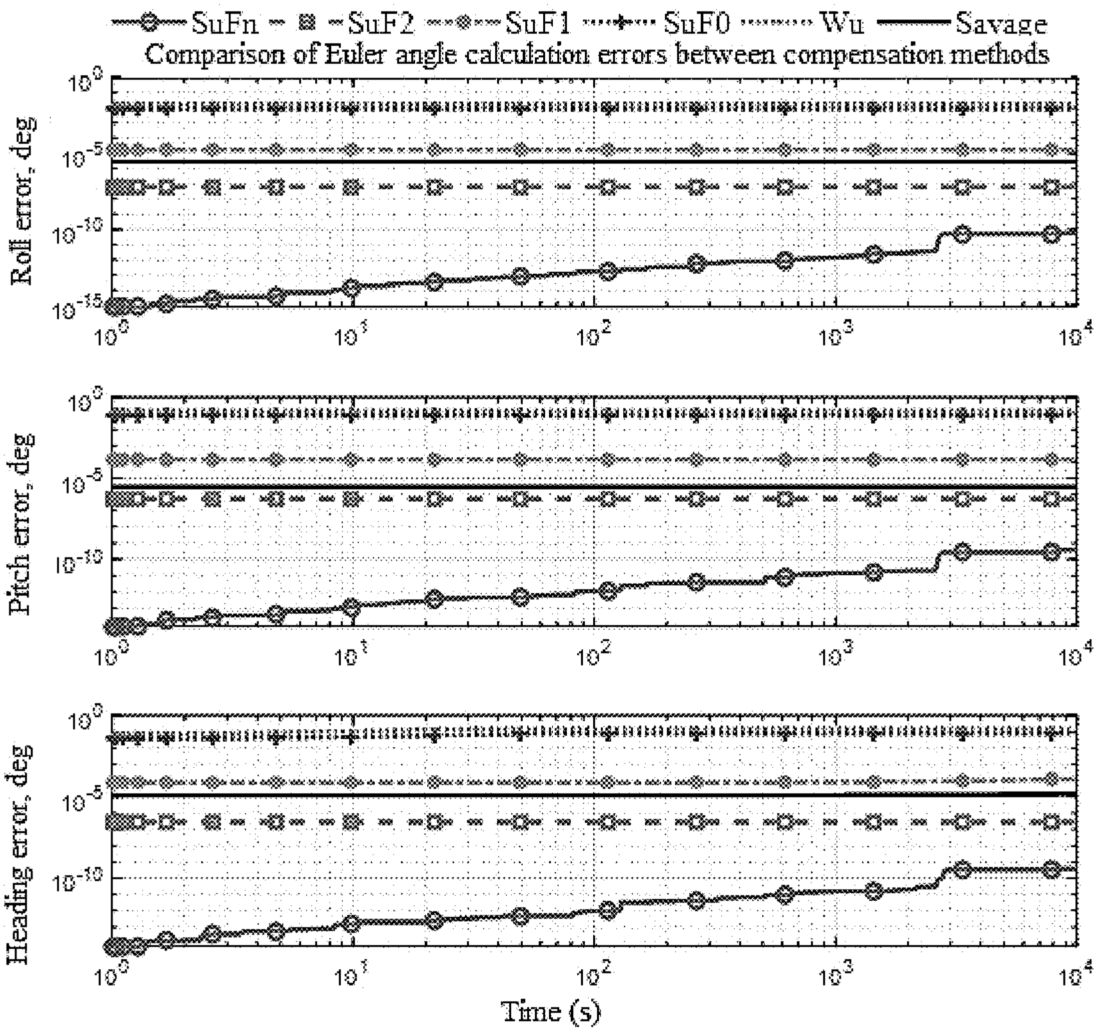
FIG. 3: Displays a chart comparing Euler angle calculations using various methods for compensating errors that cause angular computation errors.
Figure 4:
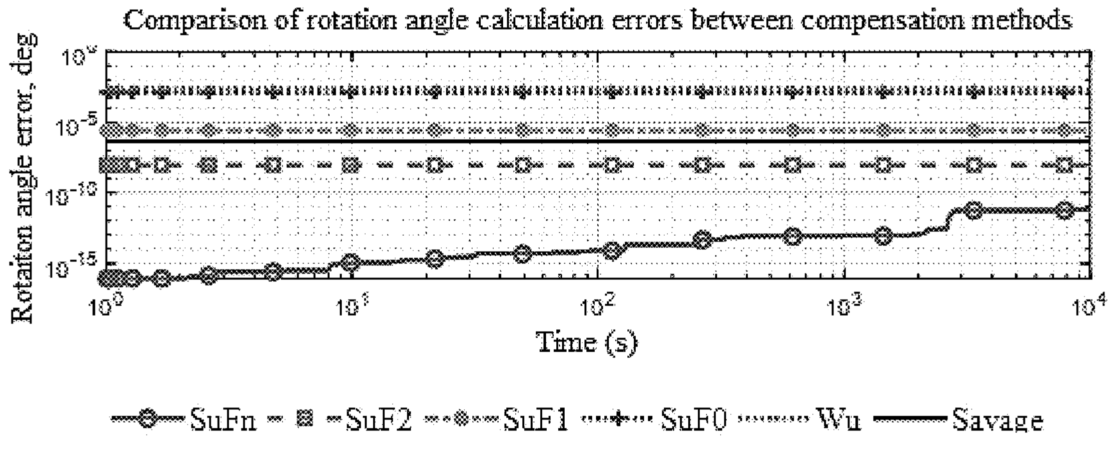
FIG. 4: Presents a chart comparing rotation angle calculations for compensation of motion errors causing angular computation errors using different compensation methods.
Figure 5:
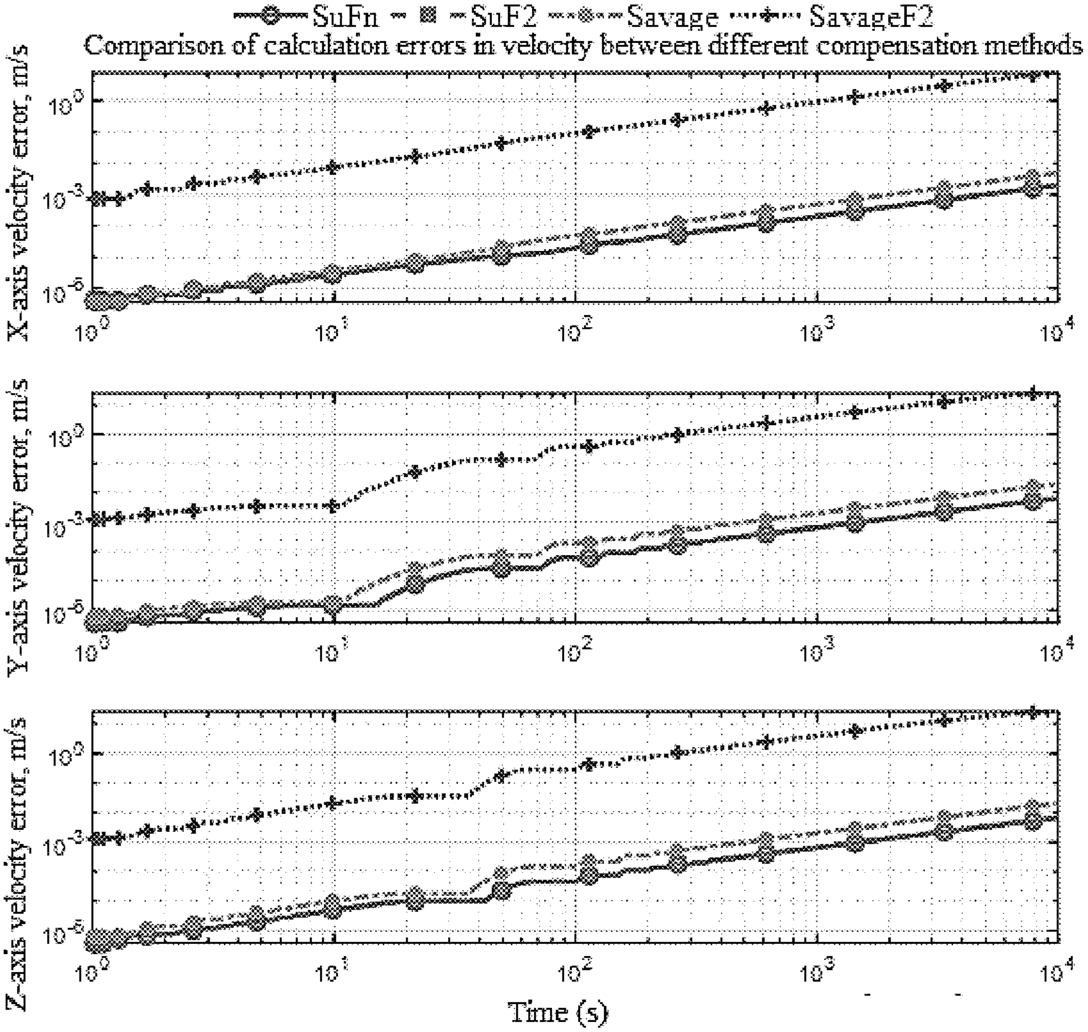
FIG. 5: Provides a chart comparing velocity calculations using various methods for compensating motion errors causing angular computation errors.
Figure 6:
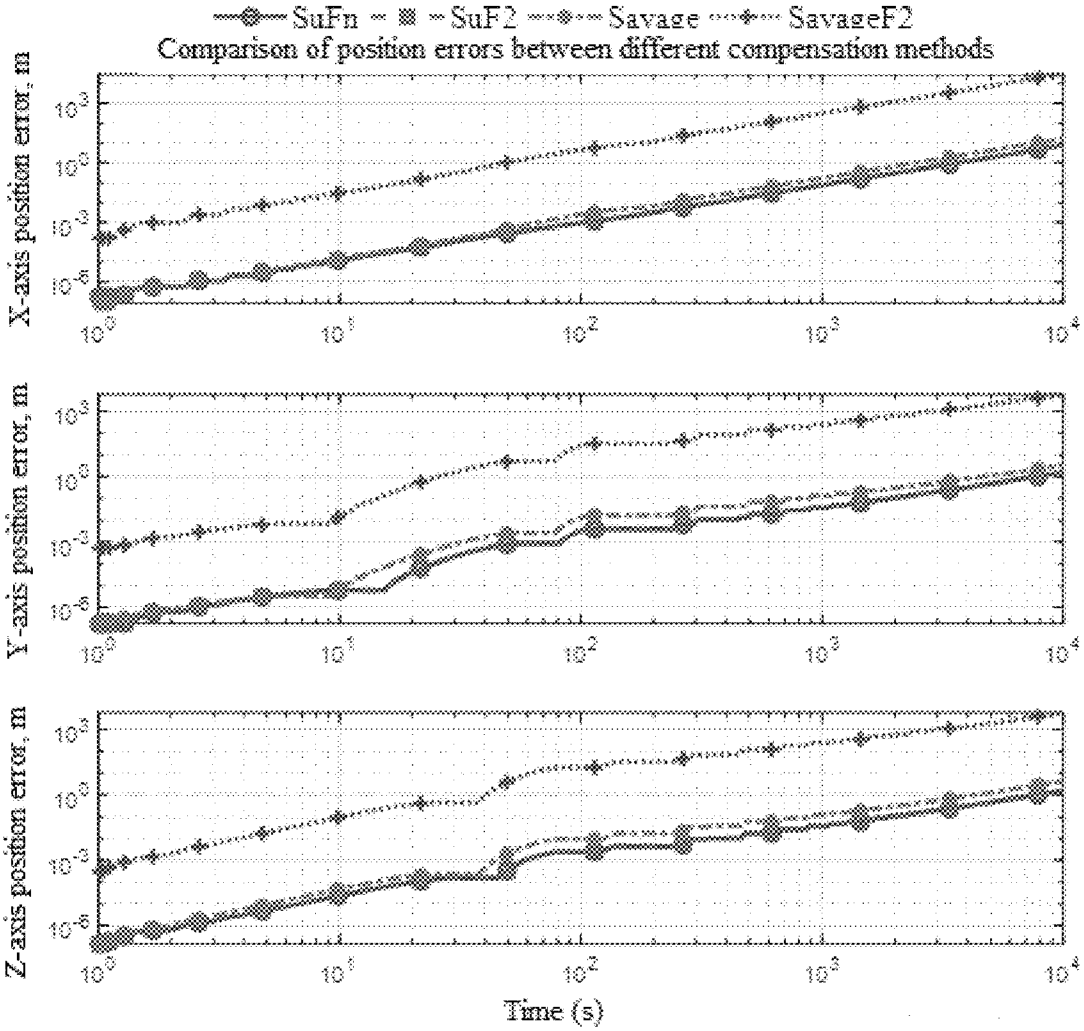
FIG. 6: Depicts a chart comparing position calculations using different methods for compensating motion errors causing angular computation errors.

Refer to the comparison results shown in FIG. 2, in which $$f_0\left(\sin\frac{x}{2}\right),\ f_1\left(\sin\frac{x}{2}\right),\ f_2\left(\sin\frac{x}{2}\right)-$$

The error approximation functions use zero-order, first-order, and second-order Taylor series expansions as indicated in expression (29) of the proposed method. These are labeled accordingly in FIG. 2 as SuF0, SuF1 và SuF2; g(x)—The error approximation functions in the first method, as shown in equation (12), are labeled as "Savage" in FIG. 2 (named after the author who used the rotation vector method).

$$k\left(2\tan\frac{x}{2}\right)$$

The error approximation functions in the second method, as shown in equation (18), are labeled as "Wu" in FIG. 2. In FIG. 2, it is evident that using second-order approximations or exact functions results in the smallest computational errors for compensating motion-induced angular computation errors.

The proposed method for compensating motion-induced velocity and position errors involves:

There are various methods for solving differential equations, such as Picard, Taylor, Euler, and Runge-Kutta. Each method has its own advantages and disadvantages. In this proposed solution, the ODE8 (Dormand-Prince) method is used to solve the differential equations.

$$\Phi=\frac{2a\sin(\Phi_p)}{\Phi_p}\Phi_p; \tag{33.1}$$

$$\dot{\eta}\approx f_{ib}^b+\frac{1}{12}(6+\phi\times)(\phi\times f_{ib}^b-\Phi\times\eta)+\frac{1}{6}(\phi\times\Phi)\times\eta \tag{33.2}$$

$$\dot{\zeta}\approx\eta+\frac{1}{36}(6+\phi\times)(\phi\times\eta-2\dot{\phi}\times\zeta)+\frac{1}{12}(\phi\times\dot{\phi})\times\zeta \tag{33.3}$$

$\Phi_p$—The compensation for motion-induced angular computation errors is calculated in the section above using (29).

The following description provides a detailed implementation of the invention with reference to the accompanying drawings (FIG. 1). The proposed implementations are presented in a clear and comprehensive manner to convey the concepts fully to those with average knowledge in the field. Although the concepts of the invention are illustrated in various forms, they should not be construed as being limited to the specific implementations described here. It should be understood that the concepts of the invention encompass all modifications, equivalents, and alternatives that fall within the scope of the invention.

The method for compensating motion-induced errors that cause angular, velocity, and position computation errors in strapdown inertial navigation systems is specified through the following steps:

Step 1: Select the computation function for compensating motion-induced errors that result in angular computation errors, based on the required angular computation error and the computational load (time). Use the theoretical error computation chart to guide this selection.

Depending on the desired computation error (accuracy), the computational load (time), or convenience for embedded system implementation, choose between an approximation function or an exact function from equation (29). Equation (29) has been theoretically computed and presented in graphical form (FIG. 2). For embedded systems, using approximation methods for multiplication is more convenient than square root operations. With computer support for error computation and computational load (time), an approximation function for compensating motion-induced angular computation errors will be provided.

Step 2: choose the computation frequency and the method for solving the system of differential equations based on the analysis of the object's motion frequency. The computation frequency depends on the motion frequency of the mechanical object, which is typically known before designing the application or environment. Alternatively, frequency spectrum analyzers can be used to determine the object's motion frequency. For strapdown inertial sensor systems with a cut-off frequency $f_1$, or additional vibration damping with a damping frequency $f_2$. the computation frequency is usually 3-5 times greater than the minimum of $f_1$ and $f_2$. The proposed but not limited differential equation solving method is the Dormand-Prince method of order 5 or higher.

Step 3: initialize initial values for strapdown inertial navigation system in the chosen reference frame. This step involves initializing the starting values for solving the differential equations system (29, 33.2, 33.3). Providing incorrect initial values will result in initialization errors in the system.

The variables requiring initial values are the initial position, velocity, and angle of the object before computation. Based on the initial values of position, velocity, and angle, the initial values for $\Phi$, $\eta$ and $\zeta$ will be computed using the related equations (28, 22.2, and 22.3). The angular velocity ($\omega$), and acceleration $$(f_{ib}^{b})$$

will be continuously updated by the Inertial Measurement Unit (IMU). As mentioned in the introduction, the final total error will be divided into three parts: errors due to incorrect initialization (such as errors in position, velocity, and angle for the object in the positioning system initialization method, typically using high-precision master devices), sensor errors (i.e., measurement errors of the IMU sensors), and errors addressed in this invention, which are errors resulting from the computation of differential equations (describing the object's dynamics).

Step 4: calculate the coning error compensation. After selecting the function in step 1, the frequency and method for solving the differential equations in step 2, and the initial values in step 3, compute the coning error compensation.

The choice of function in step 1 depends on the required error and the computational load (time) for each computation cycle. The choice of computation frequency depends on the cut-off frequency used in the inertial sensor (i.e., the sensor's limit) and the design or application of the device containing the inertial sensor.

For example, in the case when using the second-order approximation (30), a computation frequency of 100 Hz is applied for positioning devices on marine vessels (with the primary sea wave frequency concentrated between 0 and 0.3 Hz, the ship's turning motion frequency being less than 1 Hz, and the engine's vibration frequency being 50 Hz, although with much lower amplitude compared to the sea wave and motion frequencies due to the inertial sensor's location away from the engine on the ship). The proposed solution utilizes the widely known ODE8 (Dormand-Prince method of order 8). Based on the previous value $\Phi$ (at time t) and the angular velocity $\omega$ from the IMU sensor (at time t), the value of $\Phi$ at the next step (at the time t+0.01 second) is computed. This value represents the compensation for motion-induced errors affecting angular computation that needs to be calculated.

Step 5: calculate the quaternions, direction cosine matrix (DCM), and Euler angles using the coning error compensation obtained in step 4.

The purpose of this step is to calculate the Euler angles, the direction cosine matrix (DCM), or the quaternion for the next time instance (at t+0.01 seconds) after determining the motion error compensation for angular computation errors obtained in step 4 (at t+0.01 seconds). These relationships are described by equations (28) and (31).

Step 6: compute the rotation vector $\Phi$ according to equation (33.1) and the rate of change of the angular velocity vector $\dot{\Phi}$ according to equation (12).

The purpose of this step is to compute the values of the angular velocity vector and its rate of change (at time t) based on the motion error compensation for angular computation errors obtained in step 4 (at time t) to be used in the calculation of motion error compensation for velocity and position performed in step 7.

Step 7: compute the sculling and scrolling error compensation by solving the differential equations (33.2) and (33.3). This is done based on the calculation frequency, the numerical method for solving differential equations chosen in step 2, and the initial values set in step 3.

Leveraging the high accuracy (controlled in step 1) in the motion error compensation for angular computation errors calculated in step 4 (at time t), the motion error compensation for velocity and position is computed in this step by using a combination of buffers (angular velocity vector and its rate of change) from step 6 (at time t). The ODE8 (Dormand-Prince) method of order 8 is used to solve the differential equations (33.2 and 33.3) to compute the motion error compensation for velocity and position at time t+0.01 seconds.

Step 8: calculate the output values for velocity and position in the computation coordinate system. For the NED (North-East-Down) coordinate system, this involves using the DCM matrix obtained in step 5 and the velocity and position compensation calculated in Step 7.

The purpose of this step is to update the new values for position, velocity, and angles (at time t+0.01 seconds) after calculating the compensation for errors due to motion affecting the angle, velocity, and position using the relationships provided in equations (28, 22.2, and 22.3).

In the subsequent computation cycles (at times t+0.02 seconds and following), steps 4 through 8 are performed sequentially until the positioning process is completed (providing the position, velocity, and angle of the device containing the inertial measurement unit over time).

The methods outlined are detailed purely as technical solutions intended to describe the invention and are not intended to limit the scope of the invention. Although the invention is described in detail with reference to the methods outlined, it should be understood that those skilled in the art may create variations of the technical solutions described or equivalently substitute the technical features of the solutions without departing from the spirit and scope of the proposed technical solution as described in the implementation methods of the invention.

Example Implementation of the Invention

FIGS. 3 to 6 depict the results of implementing the invention using a simulated dataset of acceleration and angular velocity, which illustrates the motion-induced errors affecting angular calculations, velocity, and position as follows:

$$\omega_{ib}^{b} = -2\pi\Omega\sin(\alpha)\left[\tan\left(\frac{\alpha}{2}\right)\ \sin(2\pi\Omega t)\ -\cos(2\pi\Omega t)\right];$$

$$f_{ib}^{b} = g\left[\sin\left(2\pi\Omega t + \frac{\pi}{5}\right)\ \sin\left(2\pi\Omega t + \frac{2\pi}{3}\right)\ \sin\left(2\pi\Omega t + \frac{9\pi}{7}\right)\right]$$

in which, $g=9.81\ m/s^2$, $\alpha=10°$, $\Omega=1$ Hz.

Referring to FIGS. 3 through 6, the errors in calculations between various methods for Euler angles, quaternion values, velocity, and position, caused by motion-induced errors, are demonstrated; The lines labeled SuFn, SuF2, SuF1, and SuF0 represent the results from using the exact function for calculating motion-induced errors in angular computation (29), or the second-order, first-order, and zero-order approximations based on Taylor series expansion. Wu denotes the results from using the error compensation function for angular computation as per equation (18), while Savage and Savage F2 refer to the results from using the error compensation function for angular computation according to equation (12), with equation (12) lacking the third component on the right-hand side of the expression. The comparison results for velocity and position are benchmarked against the system with inputs from equations (33.2) and (33.3), where the error compensation due to motion-induced angular computation is theoretically calculated without errors.

Table 1 provides an example illustrating how different motion frequencies that cause errors in angular computation, velocity, and position, as well as different angular velocities, result in varying positioning output errors. This also serves as a basis for selecting the system's calculation frequency.

TABLE 1

Comparison of position calculation errors between two methods using input pairs α and Ω

| Method | α, °; Ω, Hz | 50; 1 | 10; 10 | 10; 1 |
|---|---|---|---|---|
| Su F2 | X-axis position error, km | 14, 6 | 25, 7 | 0, 008 |
| | Y-axis position error, km | 1, 3 | 0, 006 | 0, 0001 |
| | Z-axis position error, km | 23, 2 | 1, 5 | 0, 001 |
| Savage F2 | X-axis position error, km | 1770, 1 | 56, 0 | 29, 5 |
| | Y-axis position error, km | 230, 2 | 0, 2 | 0, 4 |
| | Z-axis position error, km | 1750, 2 | 4, 2 | 6, 0 |

The results from FIGS. 3 to 6 and table 1 show that the proposed method has lower errors compared to other methods within the same differential equation-solving approach.

The invention claimed is:

1. A coning, sculling and scrolling error compensation method for a strapdown navigation system for a moving object, comprising the following steps performed in an embedded system:

step 1: select a calculation function; in this step, a compensation for errors caused by motion affecting angle calculation errors is determined based on a required angle calculation accuracy and a computational load (time) achieved using theoretical error calculation charts;

choice of calculation function, whether an approximation or exact function of the differential equation below, depends on a desired accuracy, a computational load, and a convenience of implementing the computation in embedded systems, $$\dot{\phi} = \frac{1}{2}\sqrt{1-|\phi|^2}\ \omega + \frac{1}{2}\phi\times$$

here ω is an angular velocity is obtained from an inertial measurement unit (IMU), ϕ is a rotation vector, || denotes a vector magnitude, x denotes a vector cross product, $\dot{\phi}$ denotes a derivative;

with support of computational resources regarding error margins and computational load (time), selecting an appropriate approximation function for compensating motion-induced errors in angle calculations;

step 2: choose a calculation frequency and a differential equation solver;

the calculation frequency depends on a motion frequency of a mechanical object, which is usually known prior to application design or environment use, or determined using frequency spectrum analyzers; for inertial sensor systems, with a cutoff frequency $f_1$ or additional vibration damping at frequency $f_2$, the calculation frequency used is typically 3-5 times the minimum of $f_1$ and $f_2$; the differential equation solver method, though not limited to, is a dormand-prince method of order at least five;

step 3: initialize initial values for strapdown inertial navigation system in a chosen reference frame;

the initial values required are an initial position, a velocity, and an angle of the mechanical object before computation; from these initial values of position, velocity, and angle, compute initialization values (Φ, η, and ζ) according to related equations:

$$q = \sqrt{1-|\phi|^2} + \phi$$

$$v_{SF}^{B_{m}-1}(t) = \left[I + f_2(\Phi)\Phi\times + f_3(\Phi)(\Phi\times)^2\right]\eta$$

$$p_{SF}^{B_{m}-1}(t) = \left[I + 2f_3(\Phi)\Phi\times + 2f_4(\Phi)(\Phi\times)^2\right]\zeta$$

where q—is a four dimensional vector (quaternion), η—is a velocity compensation vector, ζ—is a position compensation vector in a position calculation equation, B—is a body frame, I—is an identity matrix (3×3), SF—is a specific force, v—is velocity, p—is position, $f_2$, $f_3$, $f_4$—are functions depending on the rotation vector Φ;

continuously update angular velocity values (ω), and acceleration values $$(f_{ib}^{b})$$

by the inertial measurement unit (IMU) sensor system; decomposing a final overall error into three components: an error due to incorrect initialization (such as errors in position, velocity, and angle for the object in the initialization method of the positioning system, which typically uses a highly accurate master device), an error due to measurement errors of the IMU sensor, and an error from solving the differential equations (describing the object's dynamics);

step 4: calculate a coning error compensation;

at this step, calculate compensation for errors due to motion that result in angular computation errors, after selecting the function in step 1, the frequency and differential equation-solving method in step 2, and the initial values in step 3;

criteria for selecting the function in step 1 depend on a required error and a computational load (time) for each calculation cycle, the criteria for selecting the computation frequency depend on the cutoff frequency used in the inertial measurement sensor (i.e., the sensor's usage limit) and a design or application of a device containing the inertial measurement sensor;

based on a previous value of Φ (at time t) and the angular velocity ω from the IMU sensor (at time t), calculate the value of Φ at a next time step (at time t+0.01 seconds), this value represents the correction for motion-induced errors in angle calculation that needs to be computed;

step 5: calculate the quaternion, DCM matrix, and Euler angles;

at this step, calculate a four-dimensional rotation (quaternion), a direction cosine matrix (DCM), and Euler angles based on the motion error compensation for angular calculation obtained in step 4;

the purpose of this step is to calculate the Euler angles, direction cosine matrix (DCM), or four-dimensional rotation (quaternion) at the next time step (t+0.01 seconds), following the calculation of the motion error compensation for angular calculation obtained in step 4 (at t+0.01 seconds); these relationships are described by the following equations:

$$q = \sqrt{1 - |\phi|^2} + \phi$$

$$C = (1 - 2|\phi|^2)I - 2\sqrt{1 - |\phi|^2}\,\phi\times + 2(\phi\times)^2$$

where C—is a direction cosine matrix;

step 6: compute the rotation vector value; at this step, perform the following:

calculate the rotation vector Φ with the equation:

$$\Phi = \frac{2\,a\sin(\Phi_p)}{\Phi_p}\Phi_p$$

where $\Phi_p$ is the rotation vector obtained from step 4, also computing the rotation vector $\dot{\Phi}$ with the equation:

$$\dot{\phi} \approx \omega + \frac{1}{2}\phi\times\omega + \frac{1}{12}\phi\times(\phi\times\omega)$$

the purpose of this step is to calculate the rotational vector value and the rotational vector velocity (at time t) based on the motion error compensation that results in angular computation errors obtained in step 4 (at time t), this is done to incorporate the values into the motion error compensation for velocity and position, which is performed in step 7;

step 7: compute the sculling and scrolling error compensation;

at this step, perform the calculation of motion error compensation for velocity and position by solving the differential equations:

$$\dot{\eta} \approx f_{ib}^b + \frac{1}{12}(6 + \phi\times)(\phi\times f_{ib}^b - \Phi\times\eta) + \frac{1}{6}(\phi\times\Phi)\times\eta$$

$$\dot{\zeta} \approx \eta + \frac{1}{36}(6 + \phi\times)(\phi\times\eta - 2\dot{\phi}\times\zeta) + \frac{1}{12}(\phi\times\dot{\phi})\times\zeta$$

where $f_{ib}^b$— is a specific force vector output from the inertial measurement unit (IMU);

according to the computation frequency, the numerical method for solving the differential equations chosen in step 2, and the initial values in step 3;

leverage the high accuracy (controlled in step 1) in the motion error compensation that causes angular calculation errors computed in step 4 (at time t), the motion error compensation for velocity and position is computed in this step by using a combined buffer (rotation vector and rotation vector rate) from step 6 (at time t); implement a ODE8 (dormand-prince) method of order 8 to solve the differential equations and compute the compensation for velocity and position errors at time t+0.01 seconds;

step 8: calculate velocity and position outputs in a computational coordinate system;

for the NED (North-East-Down) coordinate system, after obtaining the direction cosine matrix (DCM) from step 5 and the velocity and position offsets from step 7;

this step aims to update new values of position, velocity, and angle (at time t+0.01) after calculating offsets due to motion-induced errors in angle, velocity, and position, using the relationships described by the equations:

$$q = \sqrt{1 - |\phi|^2} + \phi$$

$$v_{SF}^{B_{m-1}}(t) = \left[I + f_2(\Phi)\Phi x + f_3(\Phi)(\Phi x)^2\right]\eta$$

$$p_{SF}^{B_{m-1}}(t) = \left[I + 2f_3(\Phi)\Phi x + 2f_4(\Phi)(\Phi x)^2\right]\zeta$$

in a next computation cycle (at time t+0.02 seconds and onwards), perform steps 4 through 8 are sequentially until the positioning computation process (providing the position, velocity, and angle of the device containing the inertial measurement sensor over time) is completed, employing the determined errors in the navigation of the object.

2. The coning, sculling and scrolling error compensation method for a strapdown navigation system according to claim 1, wherein the object comprises a vehicle.

3. The coning, sculling and scrolling error compensation method for a strapdown navigation system according to claim 1, herein the object comprises a marine vessel.

* * * * *